US012802076B2

(12) United States Patent
Collicoat

(10) Patent No.: US 12,802,076 B2
(45) Date of Patent: Nov. 17, 2026

(54) SYSTEMS AND METHODS FOR EXECUTING PARALLEL ELECTRONIC TRANSACTIONS

(71) Applicant: Worldpay, LLC, Symmes Township, OH (US)

(72) Inventor: Matthew Collicoat, Suwanee, GA (US)

(73) Assignee: Worldpay, LLC, Symmes Township, OH (US)

( * ) Notice: Subject to any disclaimer, the term of this patent is extended or adjusted under 35 U.S.C. 154(b) by 63 days.

(21) Appl. No.: 18/924,452

(22) Filed: Oct. 23, 2024

(65) Prior Publication Data

US 2025/0045765 A1 Feb. 6, 2025

Related U.S. Application Data

(63) Continuation of application No. 17/036,486, filed on Sep. 29, 2020, now Pat. No. 12,159,286.

(51) Int. Cl.

| | |
|---|---|
| ***G06Q 30/00*** | (2023.01) |
| ***G06Q 20/40*** | (2012.01) |
| *G06F 9/451* | (2018.01) |
| *G06Q 20/20* | (2012.01) |
| *G06Q 20/34* | (2012.01) |

(52) U.S. Cl.

CPC ......... *G06Q 20/4037* (2013.01); *G06F 9/451* (2018.02); *G06Q 20/202* (2013.01); *G06Q 20/204* (2013.01); *G06Q 20/34* (2013.01)

(58) Field of Classification Search

CPC ...................................................... G06Q 20/40

USPC ......... 705/44, 1.1, 45, 21, 40, 14.38, 17, 71; 382/137, 138, 300, 6, 135, 139; 707/522, 707/52, 6; 235/279

See application file for complete search history.

(56) References Cited

U.S. PATENT DOCUMENTS

| | | | | |
|---|---|---|---|---|
| 5,995,822 | A | 11/1999 | Smith et al. | |
| 6,097,834 | A * | 8/2000 | Krouse ................ | G06Q 20/042 382/137 |
| 2011/0087592 | A1 | 4/2011 | Van Der et al. | |
| 2014/0207683 | A1 | 7/2014 | Bailey | |
| 2015/0088626 | A1 | 3/2015 | Salmon et al. | |
| 2018/0253727 | A1 * | 9/2018 | Ortiz .................... | G06Q 20/023 |
| 2018/0300705 | A1 | 10/2018 | Link et al. | |
| 2018/0322489 | A1 | 11/2018 | Altenhofen | |

OTHER PUBLICATIONS ip.com NPL Search History.*

(Continued)

*Primary Examiner* — John H. Holly

(74) *Attorney, Agent, or Firm* — Bookoff McAndrews, PLLC

(57) ABSTRACT

Systems and methods are for executing an electronic transaction by a parallel transaction system. One method includes receiving, by a parallel transaction system, an electronic transaction request of a payment vehicle. The parallel transaction system may determine a type of the payment vehicle. The type of the payment vehicle is at least one of an open loop type, a closed loop type, or a parallel type. The parallel transaction system may execute an open-loop transaction, a closed-loop transaction, and/or a parallel transaction, based on the determined type of the payment vehicle. The parallel transaction system may complete the electronic transaction request.

20 Claims, 9 Drawing Sheets

(56) References Cited

OTHER PUBLICATIONS

ProQuestDIALOGNPL Search History.
Notification of Transmittal of the International Search Report and the Written Opinion of the International Searching Authority mailed Jan. 20, 2022 in International Application No. PCT/US2021/071542 (11 pages).

* cited by examiner

SYSTEMS AND METHODS FOR EXECUTING PARALLEL ELECTRONIC TRANSACTIONS

CROSS-REFERENCE TO RELATED APPLICATION

This patent application is a continuation of and claims the benefit of priority to U.S. application Ser. No. 17/036,486, filed on Sep. 29, 2020, the entirety of which is incorporated herein by reference.

TECHNICAL FIELD

The present disclosure relates generally to the field of electronic transactions and, more particularly, to systems and methods for executing electronic transactions of a transaction vehicle.

BACKGROUND

Merchants have a choice to offer open-loop payment cards or closed-loop payment cards to their customers for making purchases at their stores or e-commerce websites. Open-loop payment cards may be used at any merchant location or website similarly to a typical credit card. Closed-loop payment cards may be used only at participating merchant location or website similarly to a rewards or loyalty points cards. However, open-loop payment cards cannot take advantage of merchant rewards or promotions, and the closed-loop payment cards cannot be used at any merchant location. The present disclosure is directed to addressing these and other drawbacks to existing payment card services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a method for executing an electronic transaction by a parallel transaction system, comprising: receiving, by a parallel transaction system, an electronic transaction request of a payment vehicle; determining, by the parallel transaction system, a type of the payment vehicle, the type of the payment vehicle being at least one of an open loop type, a closed loop type, or a parallel type; executing, by the parallel transaction system, an open-loop transaction, a closed-loop transaction, and/or a parallel transaction, based on the determined type of the payment vehicle; and completing, by the parallel transaction system, the electronic transaction request.

One embodiment provides a system comprising: one or more computer readable media storing instructions for executing a parallel electronic transaction; and one or more processors configured to execute the instructions to perform operations comprising: receiving, by a parallel transaction system, an electronic transaction request of a payment vehicle; determining, by the parallel transaction system, a type of the payment vehicle, the type of the payment vehicle being at least one of an open loop type, a closed loop type, or a parallel type; executing, by the parallel transaction system, an open-loop transaction, a closed-loop transaction, and/or a parallel transaction, based on the determined type of the payment vehicle; and completing, by the parallel transaction system, the electronic transaction request.

One embodiment provides a non-transitory computer-readable medium storing instructions for executing a parallel electronic transaction, the instructions, when executed by one or more processors, causing the one or more processors to perform operations comprising: receiving, by a parallel transaction system, an electronic transaction request of a payment vehicle; determining, by the parallel transaction system, a type of the payment vehicle, the type of the payment vehicle being at least one of an open loop type, a closed loop type, or a parallel type; executing, by the parallel transaction system, an open-loop transaction, a closed-loop transaction, and/or a parallel transaction, based on the determined type of the payment vehicle; and completing, by the parallel transaction system, the electronic transaction request.

BRIEF DESCRIPTION OF THE DRAWINGS

The accompanying drawings, which are incorporated in and constitute a part of this specification, illustrate several embodiments and together with the description, serve to explain the principles of the disclosure.

DETAILED DESCRIPTION OF EMBODIMENTS

Figure 1:
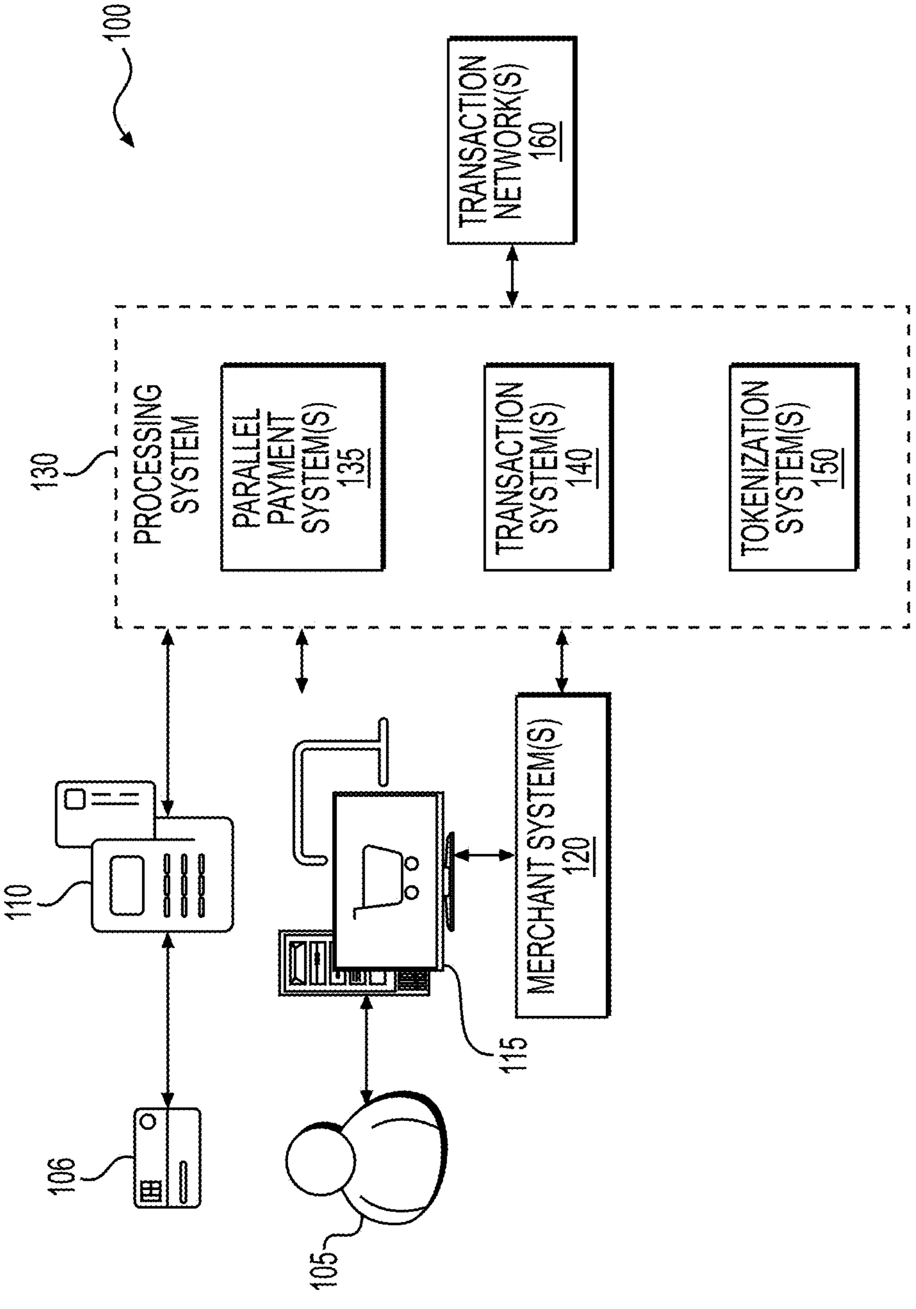
FIG. 1 depicts a block diagram of an exemplary electronic transaction system, according to one aspect of the present disclosure.

The following embodiments describe systems and methods for facilitating electronic transactions of a parallel payment vehicle. More particularly, the embodiments contemplated in the present disclosure may enable merchants and customers to utilize a parallel payment service provided by a processing system, which may be configured to perform parallel payment transactions of a parallel payment vehicle, tokenization of sensitive user and payment data, and/or electronic transaction authorizations. In one or more embodiments, the term "parallel" may refer to a solution that processes both open-loop and closed-loop transactions on a single financial product.

Conventionally, merchant issued payment vehicles (or cards) may be either open-loop payment cards or closed-loop payment cards. An open-loop payment card issued by a merchant may be a co-branded card that may display the merchant's brand name along with the name of an issuing financial company, institution, or entity on the face of the open-loop payment card. Such open-loop payment card may be used at any store, website, or apps in the world that accepts the open-loop payment vehicle's sponsoring network (e.g., VISA, MASTERCARD, DISCOVER, or AMERICAN EXPRESS). A closed-loop payment card issued by a merchant may be a privately branded card that solely displays the merchant's brand name. Such closed-loop payment card may be used at the stores, websites, or apps that are associated with the merchant that issued the closed-loop payment card. Additionally or alternatively, the closed-loop payment card may be used at the stores, websites, or apps that are not associated with the merchant that issued the closed-loop payment card. For example, the closed-loop card issued by Merchant A may be used at Merchant B's stores, websites, or apps, if Merchant A and Merchant B have a partnership agreement/relationship with each other. Typically, the closed-loop payment card issued by a merchant may be funded through the merchant's management system via promotions, coupons, reward points, etc. Merchant issued open-loop payment cards and closed-loop payment cards offer certain advantages. However, customers are unlikely to apply for both open-loop and closed-loop payment cards offered by merchants due to, for example, the inconveniences of carrying and managing two separate payments cards.

To address the above-noted problems, the present disclosure describes systems and methods that execute payment transactions of a parallel payment vehicle that may include the functionality and aspects of both open-loop and closed-loop payment vehicles. For example, a processing system including a parallel payment system, a transaction system, and a tokenization system of the present disclosure may execute payment transactions of a parallel payment vehicle. The parallel payment system may determine whether a payment vehicle of a customer received at a merchant's point of sales (POS) terminal or a merchant's e-commerce website on a browser is a parallel payment vehicle. In one embodiment, the merchant's POS terminal may also be configured to determine whether the payment vehicle received is a parallel payment vehicle. Upon determining the payment vehicle is a parallel payment vehicle, the processing system may execute the payment transaction associated with the parallel payment vehicle based on an open-loop or a closed-loop payment transaction process. The payment transaction may be executed by the processing system based on the customer's preferences for utilizing an open-loop payment account or a closed-loop payment account associated with the parallel payment vehicle.

It should be appreciated that particular consideration is made herein to purchase transactions relating to merchants. Despite this reference to purchase transactions relating to merchants, certain disclosed systems and methods may apply equally well to the various e-commerce transactions. Effectively, any circumstance where sensitive data, such as a primary account number (PAN), a personal identification number (PIN), a social security number, etc., or a token corresponding thereto, is being transmitted over a network, systems and methods disclosed herein may be employed. Further, while the party seeking to initiate a secure transaction and/or provide a third-party service may be referred to herein as a "merchant," a party seeking to initiate a secure transaction need not be a merchant, but may be a service provider, or any party seeking to execute a transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary system 100 including a point of service (POS) terminal 110, a browser 115, a merchant system(s) 120, and a processing system 130, which is in communication with a transaction network(s) 160. The POS terminal 110 may collect data of a payment vehicle 106 (e.g., credit card, debit card, gift card, loyalty card, bonus points card, digital payment device, digital wallet, etc.) from a user 105 and transfer the data of the payment vehicle 106 securely to the processing system 130. The payment vehicle 106 (e.g., credit card, debit card, contactless payment device, digital payment device, digital wallet, etc.) may be an open-loop payment vehicle, a closed-loop payment vehicle, or a parallel payment vehicle (e.g., a payment vehicle including both functionality and aspects of an open-loop payment vehicle and a closed-loop payment vehicle).

In one embodiment, an open-loop payment vehicle may be a payment vehicle (e.g., credit card, debit card, contactless payment device, digital payment device, digital wallet, etc.) that may be used at any location, online e-commerce websites, or apps where the open-loop payment vehicle's sponsoring network (e.g., VISA, MASTERCARD, DISCOVER, or AMERICAN EXPRESS) may be accepted. A user account associated with the open-loop payment vehicle may be funded by a cardholder, another person, a bank, a company, a government agency, and so forth. A closed-loop payment vehicle may be a merchant issued payment vehicle (e.g., gift card, loyalty card, bonus points card, contactless payment device, digital payment device, digital wallet, etc.). The closed-loop payment vehicle may be used at one or more particular merchant's stores, online websites, or apps that may be associated with the closed-loop payment vehicle issued by one or more merchants. Further, various types of merchants may be associated with a merchant issued closed-loop payment vehicle, such as, without limitation, retailers, restaurants, hotels, airlines, or any other provider of goods or services. A parallel payment vehicle may be issued by one or more merchants and/or any suitable financial institution. The parallel payment vehicle may include functionality and aspects of both open-loop payment vehicle and closed-loop payment vehicle. That is, a parallel payment vehicle may be used at anywhere either the open-loop payment vehicle or the closed-loop payment vehicle associated with the parallel payment vehicle may be accepted (further discussed in detail below).

Still referring to FIG. 1, in one embodiment, the POS terminal 110 may be configured to detect whether the payment vehicle 106 is an open-loop payment vehicle, a closed-loop payment vehicle, or a parallel payment vehicle. The POS terminal 110 may interact with the merchant system 120, and/or directly with the processing system 130 to execute electronic payment transactions associated with the payment vehicle 106. The merchant system 120 may be a payment terminal (e.g., a "pin pad"), or, a data server, for example, displaying a merchant's e-commerce store. The user 105 may provide sensitive data associated with the payment vehicle 106 directly, such as at the POS terminal 110 at a retail location, or via, for example, remotely via the browser 115. The browser 115 may interact with the merchant system 120, and/or directly with the processing system 130 to in order to facilitate the execution of payment transactions associated with the payment vehicle 106. The browser 115 may be a client-side browser on a user computing device, but may also be a client-side app, or any other type of client-side data processor. The browser 115 may also collect data associated with the payment vehicle 106 from the user 105 and transfer the data securely to the transaction network(s) 160 via an intermediary such as the processing system 130. The processing system 130, such as a payment processor, may be an intermediary in this system to ensure validity of a payment request associated with the payment vehicle 106.

Still referring to FIG. 1, the processing system 130 may include a parallel payment system(s) 135, a transaction system(s) 140, and a tokenization system(s) 150. The parallel payment system 135 may receive a payment transaction request along with the data associated with the payment vehicle 106 from the POS terminal 110, the browser 115, and/or a merchant system 120. In one embodiment, the processing system 130 may store sensitive personal and payment data provided by the user 105 in a server(s) or a database(s) (not shown) for further processing. Further, the processing system 130 may transmit the sensitive personal and payment data to the parallel payment system 135, transaction system 140, and/or tokenization system 150 to provide parallel payment service(s), complete purchase transactions, and perform tokenization of payment data. For example, the processing system 130 may transmit an electronic payment request (e.g., an authentication request and/or authorization request) to the transaction network 160 and receive a response indicating a result of the electronic payment request (e.g., an authentication request and/or an authorization response). In one embodiment, when the merchant system 120 transmits an authorization request for completing a purchase transaction, the processing system 130 may act, via the parallel payment system 135 and the transaction system 140, as an intermediary for the merchant system 120 and transmit the authorization request to the transaction network 160. The processing system 130 may also receive an authorization response with a result of the authorization request from the transaction network 160, and may transmit the authorization response to the merchant system 120.

In one embodiment, the parallel payment system 135 may determine, whether the payment vehicle 106 is an open-loop payment vehicle, a closed-loop payment vehicle, or a parallel payment vehicle. The parallel payment system 135 may determine the payment vehicle type based on the information (e.g., a primary account number (PAN), a personal identification number (PIN), a social security number, merchant identification number (MID), bank identification number (BIN), issuer identification number (IID), etc.) associated with the payment vehicle 106 received from the POS terminal 110, the browser 115, and/or the merchant system 120. If the parallel payment system 135 determines that the payment vehicle 106 is an open-loop payment vehicle, the parallel payment system 135 may communicate with the transaction system 140 and the tokenization system 150 to facilitate the execution of the payment process in accordance with an open-loop payment transaction process of the present disclosure. If the parallel payment system 135 determines that the payment vehicle 106 is a closed-loop payment vehicle, the parallel payment system 135 may communicate with the transaction system 140 and the tokenization system 150 to facilitation execution of the electronic payment process in accordance with a closed-loop payment transaction process of the present disclosure. However, if the parallel payment system 135 determines that the payment vehicle 106 is a parallel payment vehicle, the parallel payment system 135 may facilitate the execution of the electronic payment process through the open-loop payment transaction process and/or the closed-loop payment transaction process of the present disclosure (further explained in detail below).

Still referring to FIG. 1, the transaction system 140 may comprise a plurality of systems, including a server for receiving and storing the data associated with the payment vehicle 106. Further, the transaction system 140 may communicate with the parallel payment system 135, the tokenization system 150, and the transaction network 160 to execute electronic payment transactions and payment authorization processes of the present disclosure. The transaction network 160 may include payment networks, issuer systems, and/or acquirer systems to facilitate the authorization or approval of various electronic transaction request (e.g., merchant store transactions, e-commerce transactions, etc.). The transaction system 140 may transmit payment information (e.g., method of payment, merchant payment tokens, etc.) to the tokenization system 150. The tokenization system 150 may then tokenize the payment information received from the transaction system 140 to generate a token for authenticating and authorizing purchase transactions. A token may be a low-value token or a high-value token. Further, a token may be a randomly generated number. In other embodiments, a token may be a pseudorandom number, encrypted information, or other character sequence. The transaction system 140 may securely return a transaction response to merchant system 120, along with the token generated by the tokenization system 150. Further, the processing system 130 may communicate with the transaction network 160 to authorize payments requested by the merchant system 120 based on the data associated with the payment vehicle 106 provided by the user 105 before, during or after electronic purchase transactions.

In one embodiment, the processing system 130 may transmit a token generated by the tokenization system 150 to the merchant system 120, such that the merchant system 120 may store the token for future transactions. The token may be unique per transaction, per user, and/or per merchant or organization. Thus, if a given user makes a purchase at merchant A, token A may be generated, but if the user makes a purchase at merchant B, even if the same payment method is used, token B may be generated. By utilizing a token, the merchant system 120 may not need to send payment information or other sensitive data for subsequent transactions, and may instead use the token for subsequent transactions. Therefore, tokenization may enhance data security as well as merchants' convenience in processing subsequent electronic transactions.

Figure 2:
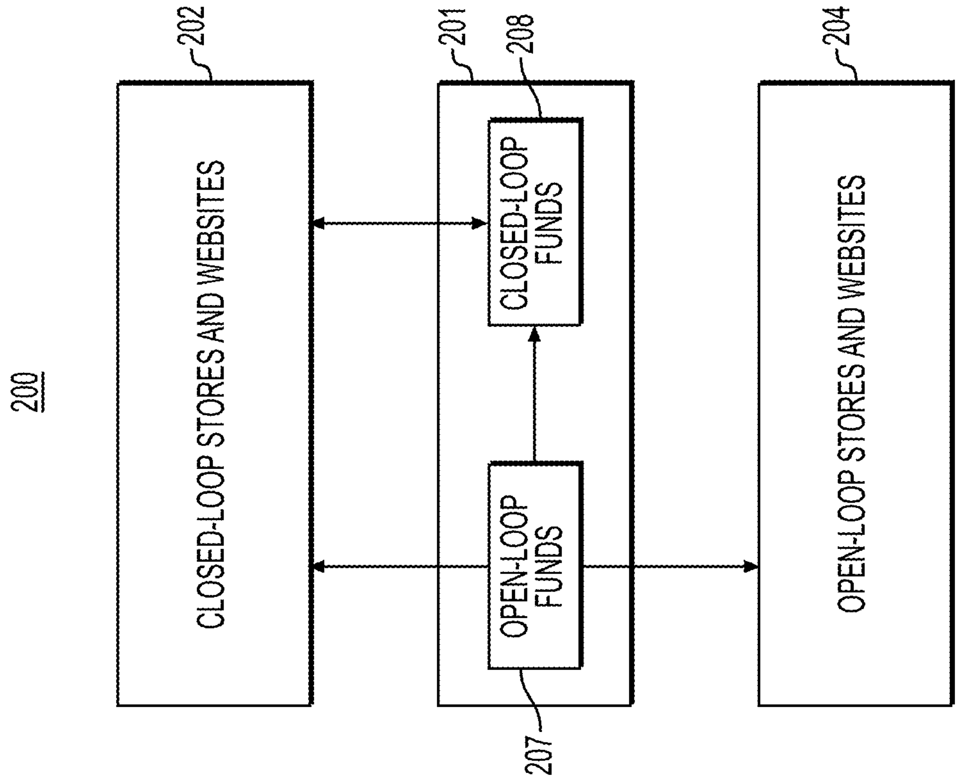
FIG. 2 depicts a block diagram of an exemplary parallel transaction system, according to one aspect of the present disclosure.

FIG. 2 shows a block diagram of an exemplary system 200 including a parallel payment vehicle 201, closed-loop stores and websites 202, and open-loop stores and websites 204. The parallel payment vehicle 201 may be a payment vehicle that may be associated with both open-loop and closed-loop payment accounts. An open-loop payment account may include open-loop funds 207 that may be used at any open-loop stores, websites, and apps. A closed-loop payment account may include closed-loop funds 208 that may be used at any participating merchant closed-loop stores, websites, and apps. The open-loop funds 207 and the closed-loop funds 208 may be associated with any monetary funds provided by a merchant, a retailer, an employer, a merchant bank, an employer bank, a financial institution, or any other suitable type of entity. In one embodiment, the closed-loop stores and websites 202 may be any participating merchant store, website, and/or app that may accept closed-loop funds 208. The open-loop stores and websites 204 may be any merchant store, website, and/or app that may accept payments sponsored by one or more open-loop payment transaction networks (e.g., MasterCard, Visa, American Express, Union Pay, etc.). In some embodiments, while the open-loop stores and websites 204 may only accept open-loop funds 207, the closed-loop stores and websites 202 may accept both the open-loop funds 207 and the closed-loop funds 208.

In one embodiment, the open-loop funds 207 of the parallel payment vehicle 201 may be used similarly to available credit on a credit card and/or available balances on debit card, a gift card, or a prepaid card, etc. that may be spent in any merchant store, website, and/or app that may accept such cards. The closed-loop funds 208 of the parallel payment vehicle 201 may be earned through participating merchants that may distribute the closed-loop funds 208 through promotions or other programs, for example, bonus points, loyalty points, coupons, special offers, etc. In some embodiments, the closed-loop funds 208 may be added manually or automatically by the user 105, merchant system 120, and/or the processing system 130. Further, the closed-loop funds 208 may be added from the open-loop funds 207 associated with the parallel payment vehicle 201. Further, the closed-loop funds 208 may spent with or without limits based on the account holder's preference.

The parallel payment vehicle 201 of the present disclosure may, for example, provide the following benefits for the issuing merchants and the account holders of the parallel payment vehicle 201: use the parallel payment vehicle 201 anywhere in the world; raise brand awareness of the issuing merchant of the parallel payment vehicle 201; collect data on customer spend patters outside of the merchant's store; load into digital wallets; lower delinquency rates; interchange income from spending in other merchant stores; provide maximum cashback capacity; provide special offers and coupons to drive timely spending of the funds associated with the parallel payment vehicle 201; increase average ticket size; drive incremental sales; and no payment network scheme interchange costs.

In one embodiment, the parallel payment vehicle 201 may be issued via an online or in store. The parallel payment vehicle 201 may be instantly issued by printing plastic in store, or by provisioning credentials through secure channel so a cardholder may have an account number, an expiration date, and/or a Card Verification Code (CVC) immediately. The cardholder of the parallel payment vehicle 201 may set up a number of attributes for the parallel payment vehicle 201 by using a merchant hosted website and/or app. For example, the cardholder may provide contact details, preferences as to how the open-loop funds 207 and closed-loop funds 208 may be spent (e.g., automatically, manually, via prompt, etc.).

Figure 3:
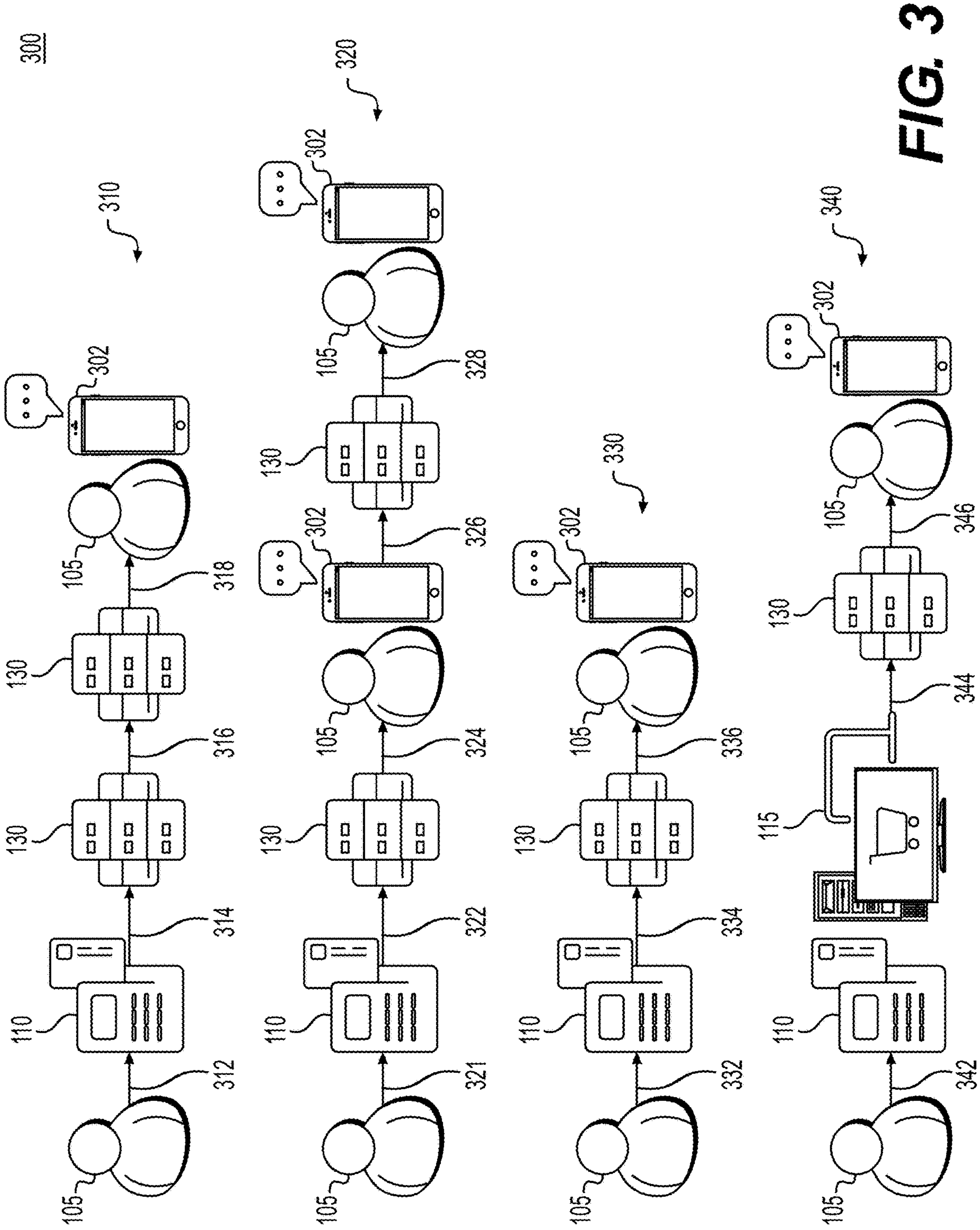
FIG. 3 depicts a flowchart of an exemplary method of executing various parallel transactions, according to one aspect of the present disclosure.

FIG. 3 depicts a flowchart of an exemplary method 300 contemplating various processes for executing parallel payment vehicle transactions. An exemplary process 310 of the method 300 illustrates a near real-time automatic redemption process using the closed-loop funds 208 of the parallel payment vehicle 201 at a closed-loop merchant store (e.g., closed-loop stores and websites 202). For example, at step 312 the user 105 (e.g., a customer) may shop at a merchant's store (e.g., closed-loop stores and websites 202) and swipe the parallel payment vehicle 201 (e.g., a parallel payment card) at the POS terminal 110 of the merchant's store to complete a purchase payment transaction. The POS terminal 110 may then recognize that the card swiped is a parallel payment card that was issued by the merchant system 120 or other suitable entities. At step 314, the POS terminal 110 may transmit a payment request to the processing system 130 to complete the purchase transaction. The processing system 130, for example, via the transaction system 140, may then complete the purchase transaction by using the open-loop funds 207 of the parallel payment vehicle 201. At step 316, after the payment transaction has been completed using the open-loop funds 207, the parallel payment system 135 may automatically check the balance of the closed-loop funds 208 of the parallel payment vehicle 201. The parallel payment system 135 may also check the payment preference, previously set by the user 105, for using the open-loop funds 207 and/or the closed-loop funds 208. In one embodiment, the user 105 may set the payment preference to prioritize using the closed-loop funds 208 before using the open-loop funds 207. At step 316, the parallel payment system 135 may then initiate the process for refunding the amount of the open-loop funds 207 used back to the open-loop funds 207 of the parallel payment vehicle 201. That is, the parallel payment system 135 may determine whether there is an available balance in the closed-loop funds 208 to pay for the purchase payment transaction. If there is an available balance, then the parallel payment system 135 may apply the closed-loop funds 208 toward the purchase payment transaction and refund all or some of the open-loop funds 207, depending on the amount of available balance in the closed-loop funds 208. At step 318, the processing system 130 may send a notification (e.g., a text message, email, etc.) to the user 105 (e.g., a user device 302) indicating that all or some of the open-loop funds 207 used for the purchase payment transaction has been refunded. The notification may also include a message indicating the amount of closed-loop funds 208 that were used instead.

Still referring to FIG. 3, an exemplary process 320 of the method 300 illustrates a manual redemption process by using the closed-loop funds 208 of the parallel payment vehicle 201 at a closed-loop store (e.g., closed-loop store and websites 202). For example, at step 321 the user 105 (e.g., a customer) may shop at a merchant's store (e.g., closed-loop store and websites 202) and swipe the parallel payment vehicle 201 (e.g., a parallel payment card) at the POS terminal 110 to complete a purchase transaction. The POS terminal 110 may then recognize that the card swiped is a parallel payment card that was issued by the merchant system 120 or any other suitable entities. At step 322, the POS terminal 110 may transmit a payment request to the processing system 130 to complete the purchase transaction. The processing system 130, for example, via the transaction system 140, may then complete the purchase transaction by using the open-loop funds 207 of the parallel payment vehicle 201. At step 324, after the payment transaction has been completed using the open-loop funds 207, the user 105 may access, via the user device 302, a management website or an app of the parallel payment vehicle 201. The user 105 may search for the completed earlier transaction using the open-loop funds 207. The user 105 may then choose the amount of the closed-loop funds 208 for reducing the amount of the open-loop funds 207 that were used in the earlier transaction. At step 326, the processing system 130 may refund some or all of the open-loop funds 207 and reduce the available balance of the closed-loop funds 208. At step 328, the processing system 130 may transmit a notification (e.g., a text message, email, etc.) to the user 105 (e.g., the user device 302) indicating that all or some of the open-loop funds 207 used for the purchase payment transaction has been refunded. The notification may also include a message indicating the amount of closed-loop funds 208 that were used instead.

Still referring to FIG. 3, an exemplary process 330 of the method 300 illustrates a real-time automatic redemption process using the closed-loop funds 208 of the parallel payment vehicle 201 at a closed-loop store (e.g., closed-loop stores and websites 202). For example, at step 332 the user 105 (e.g., a customer) may shop at a merchant's store (e.g., closed-loop stores and websites 202) and swipe the parallel payment vehicle 201 at the POS terminal 110 to complete a purchase payment transaction. The POS terminal 110 may then recognize that the card swiped is a parallel payment card that was issued by the merchant system 120 or any other suitable entities. At step 334, the POS terminal 110 may transmit a payment request to the processing system 130 to complete the purchase payment transaction. The processing system 130, for example, via the parallel payment system 135, may determine the payment preference of the user 105 for using the open-loop funds 207 and the closed-loop funds 208. In one embodiment, if the user 105 has set the payment preference to always use the closed-loop funds 208, if available, the processing system 130 may reduce the closed-loop funds 208 by the purchase transaction amount and approve the purchase transaction. At step 336, the processing system 130 may send a notification (e.g., a text message, email, etc.) to the user 105 (e.g., the user device 302) indicating the purchase payment transaction has been completed using the closed-loop funds 208. The notification may also include a message indicating the amount of the closed-loop funds 208 that was used.

Still referring to FIG. 3, an exemplary process 340 of the method 300 illustrates a real-time choice process using the parallel payment vehicle 201 at a closed-loop store (e.g., closed-loop stores and websites 202). For example, at step 342 the user 105 (e.g., a customer) may shop at a merchant's store (e.g., closed-loop stores and websites 202) and swipe the parallel payment vehicle 201 at the POS terminal 110. Also, the user 105 may perform online checkout at the merchant's website provided by the merchant system 120 on the browser 115 to complete a purchase transaction. The POS terminal 110 may then recognize that the card swiped is a parallel payment card that was issued by the merchant system 120 or any other suitable entities. The merchant system 120 may also recognize that the information entered on the merchant's website by the user 105 for completing the purchase payment transaction is associated with the parallel payment vehicle 201. At step 344, the POS terminal 110 or the merchant system 120 may transmit a payment request, for example, via an Application Programming Interface (API), to the processing system 130 to complete the purchase payment transaction. The processing system 130, for example, via the parallel payment system 135, may determine the payment preference of the user 105 for using the open-loop funds 207 and the closed-loop funds 208. In one embodiment, the user 105 may set the payment preference to use the closed-loop funds 208, if available. The processing system 130 may then provide a graphical prompt, displayed on the POS terminal 110 or the browser 115, for the user 105 to choose between paying with the open-loop funds 207 or the closed-loop funds 208. If the user 105 chooses to pay with the open-loop funds 207, then the processing system 130 will proceed to completing the purchase payment transaction using the open-loop funds 207. If the user 105 chooses to pay with closed-loop funds 208, then the processing system 130 may reduce the available closed-loop funds 208 by the purchase transaction amount. At step 346, the processing system 130 may send a notification (e.g., a text message, email, etc.) to the user 105 (e.g., the user device 302) indicating the purchase transaction has been completed using the open-loop funds 207 and/or the closed-loop funds 208. The notification may also include a message indicating the amount of the open-loop funds 207 and/or the closed-loop funds 208 that were used.

In one embodiment, the processes and the methods described in FIG. 3, as well as the processes and the methods described hereafter may be executed by the systems 100 and 200. The systems 100 and 200 may utilizes a software development kit (SDK) server (not shown) that may provide various SDK functions (or SDK) that the merchant system 120 may utilize to configure the POS terminal 110 and the browser 115 to facilitate communication with the processing system 130. Further, the systems 100 and 200 may utilize an application programming interface (API) server (not shown) that may provide various APIs that the merchant system 120 may to configure the POS terminal 110 and the browser 115 to facilitate communication with the processing system 130.

Figure 4:
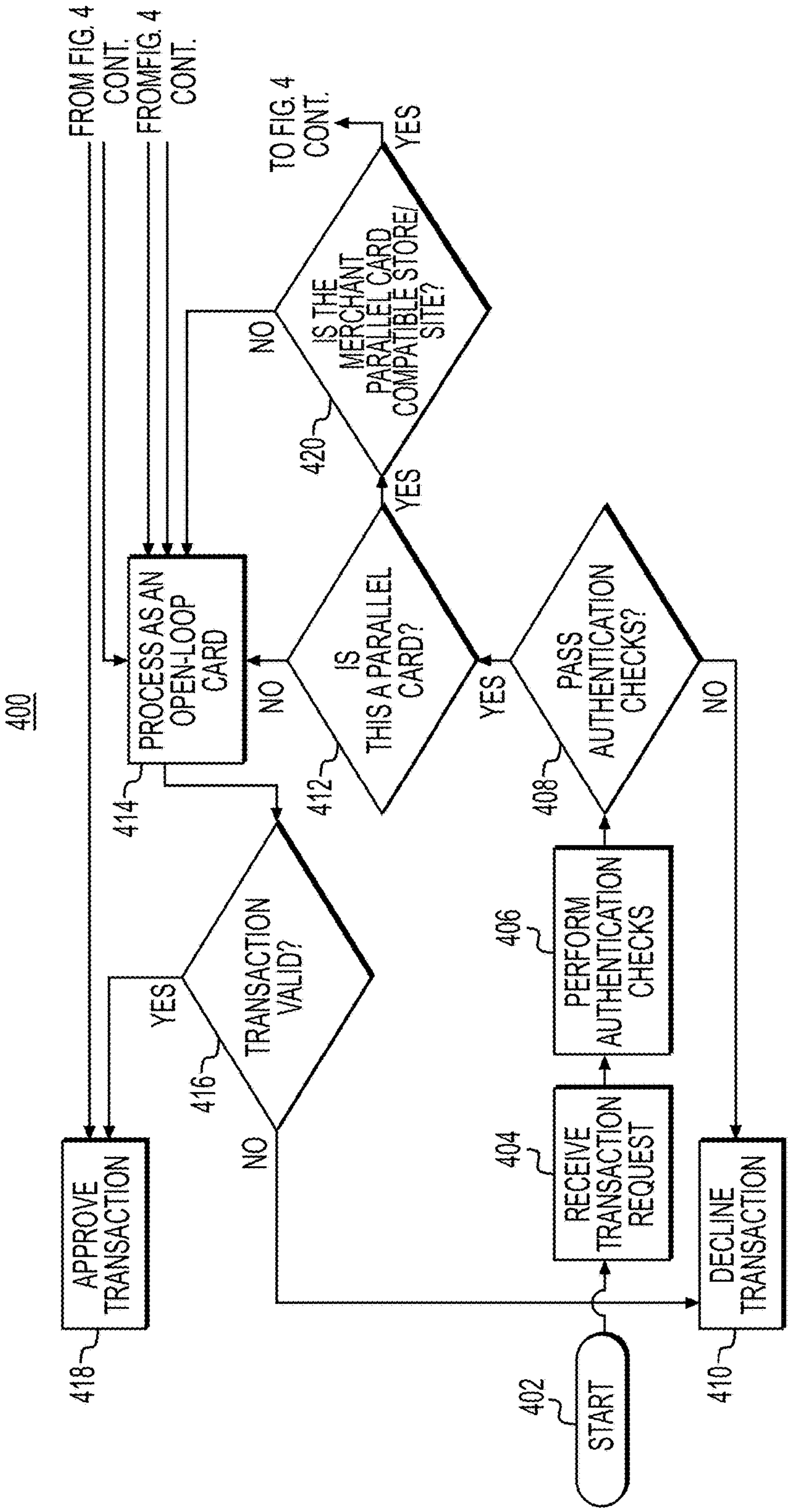
FIG. 4 depicts a flowchart of an exemplary method of executing a parallel transaction, according to one aspect of the present disclosure.
Figure 4:
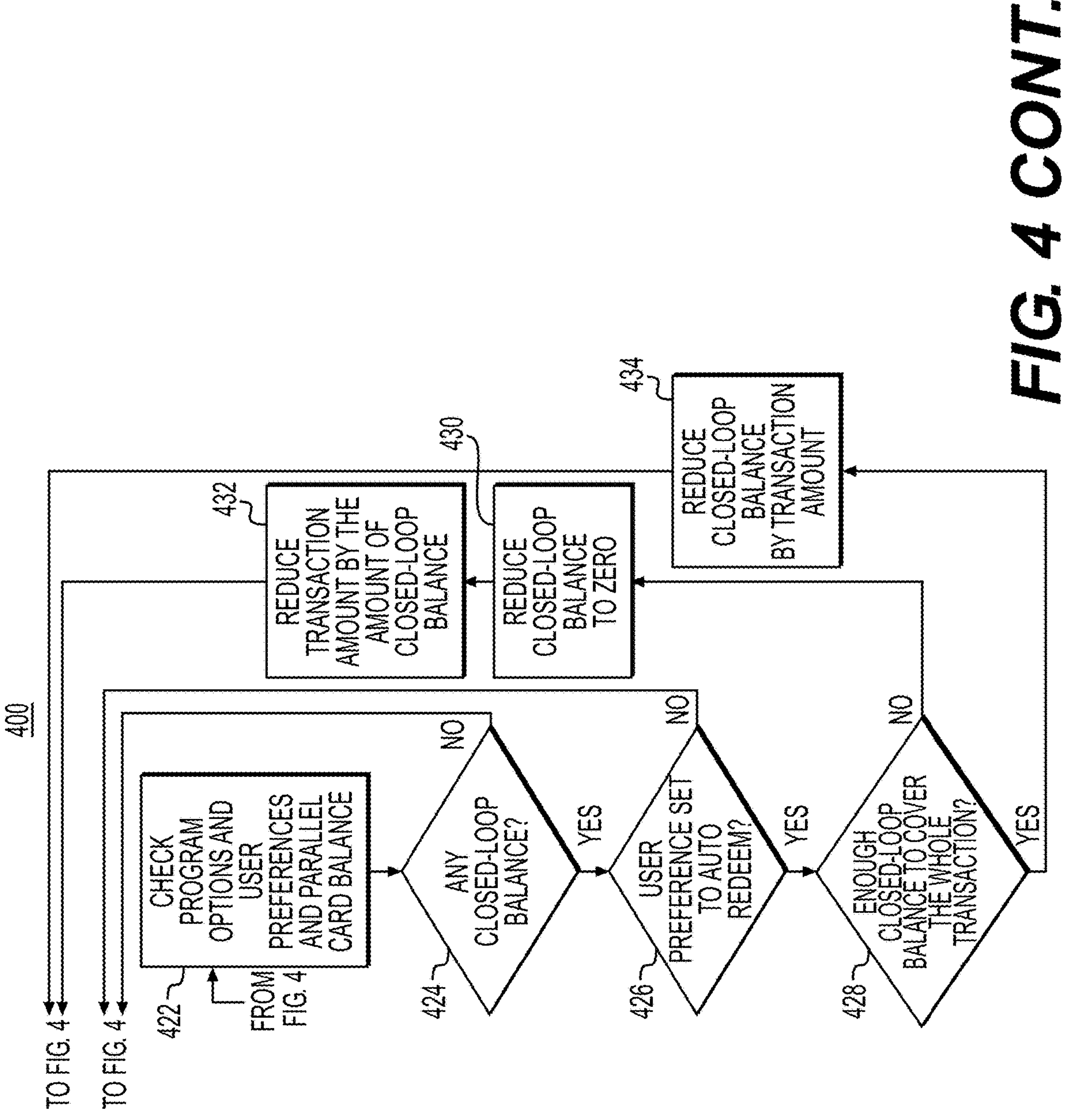

FIG. 4 depicts a flowchart of an exemplary method 400 for executing parallel payment vehicle transactions in accordance with of the present disclosure. One exemplary process flow of the method 400, performed in accordance with the systems 100 and 200 above, is described hereinafter.

In one embodiment, at step 402, the user 105 may start a purchase transaction at a merchant's store by swiping a payment vehicle (e.g., the payment vehicle 106 or the parallel payment vehicle 201) or entering information associated with the payment vehicle at the POS terminal 110 or the browser 115. The merchant system 120 associated with the POS terminal 110 or the browser 115 may transmit a payment transaction request to the processing system 130. At step 404, the processing system 130 may receive the payment transaction request from the merchant system 120 and perform payment authentication checks at step 406 by communicating with the transaction network 160. At step 408, the processing system 130 may determine whether the payment transaction request associated with the payment vehicle of the user 105 passes the payment authentication check. If the payment transaction request does not pass the payment authentication check, then the processing system 130 may decline the payment transaction request at step 410. The processing system 130 may then transmit a notification (e.g., a text message, email, etc.) to the merchant system 120 indicating that the payment request transaction associated with the payment vehicle of the user 105 failed to pass the authentication checks. If the payment transaction request passes the authentication check, then the parallel payment system 135 may determine whether the payment vehicle of the user 105 is a parallel payment vehicle (e.g., the parallel payment vehicle 201 or a parallel card) at step 412.

At step 412, if the parallel payment system 135 determines that the payment vehicle of the user 105 is not a parallel payment vehicle, then the processing system 130 may process the payment transaction request in accordance with the open-loop payment vehicle payment process at step 414. At step 416, the processing system 130 may communicate with the transaction network 160 to determine whether the purchase transaction request associated with the payment vehicle of the user 105 is valid. If the purchase transaction request is not valid, then the processing system 130 may decline the transaction at step 410. If the processing system 130 determines that the purchase transaction request associated with the payment vehicle of the user is valid, then the processing system 130 may proceed to approve and complete the purchase transaction request at step 418.

Referring back to step 412, if the parallel payment system 135 determines that the payment vehicle of the user 105 is a parallel card (e.g., the parallel payment vehicle 201), then the parallel payment system 135 may determine whether the parallel card is compatible with the merchant's store at step 420. If the parallel payment system 135 determines that the parallel card is not compatible with the merchant's store or website, then the processing system 130 may proceed to step 414 and complete the transaction in accordance with the open-loop payment process as described above. If the parallel payment system 135 determines that the parallel card is compatible with the merchant's store or website, then the parallel payment system 135 may check for merchant program options, user payment preferences, and/or the parallel card's available balance at step 422. At step 424, the parallel payment system 135 may determine whether the parallel card has any available closed-loop fund balance. If the parallel payment system 135 determines that there is no available closed-loop fund balance associated with the parallel card, then the processing system 130 may proceed to step 414 and complete the transaction in accordance with the open-loop payment process as described above. If the parallel payment system 135 determines that there is an available closed-loop fund balance, then the parallel payment system 135 may proceed to step 426 to check the user payment preferences of the parallel card.

Still referring to FIG. 4, at step 426, the parallel payment system 135 may check whether the user preferences of the parallel card is set to automatic redemption. If the user payment preferences of the parallel card is not set to automatic redemption, then the processing system 130 may proceed to step 414 and complete the transaction in accordance with the open-loop payment process as described above. If the user payment preferences of the parallel card is set to automatic redemption, then the parallel payment system 135 pay proceed to step 428 to determine whether there is enough available closed-loop fund balance cover the entire payment transaction amount. If the available closed-loop fund balance cannot cover the entire payment transaction amount, the processing system 130 may reduce the closed-loop fund balance to zero at step 430. At step 432, the processing system 130 may then reduce the payment transaction amount by the amount of the available closed-loop balance. The processing system 130 may then proceed to step 414 and complete the purchase payment transaction in accordance with the open-loop payment process as described above. If the parallel payment system 135 determines that there is available closed-loop fund balance to cover the entire payment transaction amount, the processing system 130 may reduce the closed-loop balance by the payment transaction amount at step 434. The processing system 130 may then approve and complete the purchase payment transaction at step 418.

Figure 5:
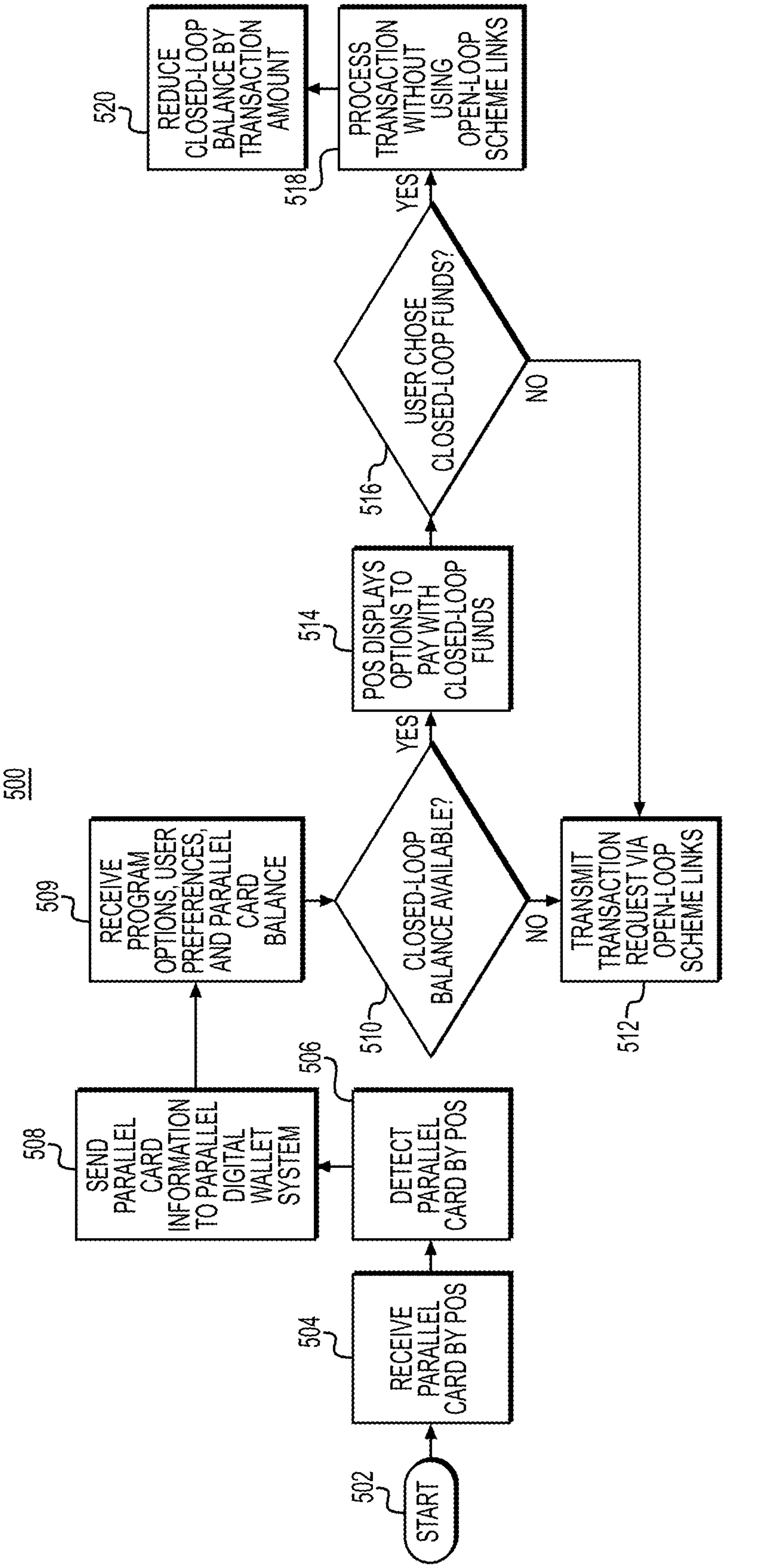
FIG. 5 depicts a flowchart of another exemplary method of executing a parallel transaction, according to one aspect of the present disclosure.

FIG. 5 depicts a flowchart of another exemplary method 500 for executing parallel payment vehicle transactions in accordance with of the present disclosure. One exemplary process flow of the method 400, performed in accordance with the systems 100 and 200 above, is described hereinafter. One exemplary process flow of the method 500, performed in accordance with the systems 100 and 200 above, is described hereinafter.

In one embodiment, at step 502, the user 105 may start a purchase transaction at a merchant's store by swiping the parallel payment vehicle 201 (or parallel card) or manually entering information associated with the parallel payment vehicle 201 at the POS terminal 110. At step 504, the POS terminal 110 may receive the information associated with the parallel payment vehicle 201. At step 506, the POS terminal 110 may detect or recognize that the information received is associated with the parallel payment vehicle 201. In one embodiment, the POS terminal 110 may be configured to determine the types of payment vehicles based on the information (e.g., a primary account number (PAN), a personal identification number (PIN), a social security number, merchant identification number (MID), bank identification number (BIN), issuer identification number (IID), etc.) associated with the payment received at the POS terminal 110. At step 508, the POS terminal 110 may send, for example, via an API, the information associated with the parallel payment vehicle 201 to the parallel payment system 135. At step 509, the parallel payment system 135 may receive and check for merchant program options, user payment preferences, and/or the parallel payment vehicle 201 balance. At step 510, the parallel payment system 135 may determine whether the parallel payment vehicle 201 has any available closed-loop fund balance. If the parallel payment system 135 determines that there is no available closed-loop fund balance associated with the parallel payment vehicle 201, then, at step 512, the processing system 130 may proceed to complete the purchase payment transaction in accordance with the open-loop payment process (e.g., via open-loop payment network scheme links) similarly to steps 414-418 as described above. If the parallel payment system 135 determines that there is an available closed-loop fund balance, then the parallel payment system 135 may proceed to step 514.

Still referring to FIG. 5, at step 514, the POS terminal 110 may display a graphical user interface with options for the user 105 to choose whether to pay with closed-loop funds 208 of the parallel payment vehicle 201. At step 516, if the user 105 chooses not to use the closed-loop funds 208, then the processing system 130 may proceed to step 512 to complete the purchase payment transaction in accordance with the open-loop payment process (e.g., via open-loop payment network scheme links) similarly to steps 414-418 as described above. If the user 105 chooses to use the closed-loop funds 208, the processing system 130 may process the payment transaction without using open-loop payment process at step 518. At step 520, the processing system 130 may reduce the available balance of the closed-loop funds 208 by the purchase transaction amount and complete the purchase payment transaction by communicating with the merchant system 120, for example, via an API.

Figure 6:
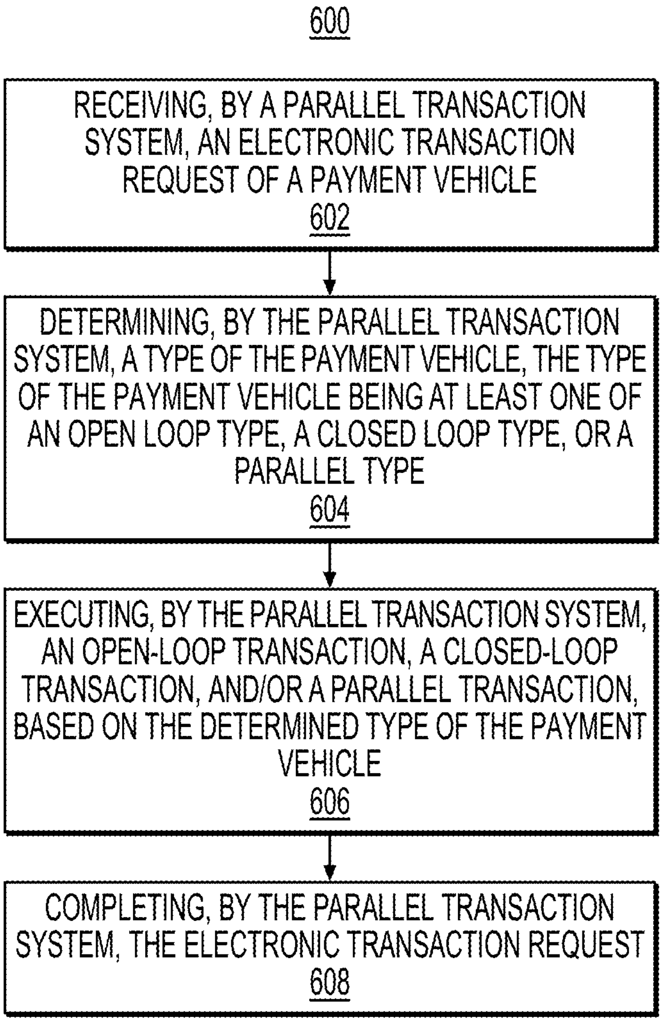
FIG. 6 depicts a flowchart of yet another exemplary method of executing a parallel transaction, according to one aspect of the present disclosure.

FIG. 6 depicts a flowchart of yet another exemplary method 600 for performing a parallel electronic transaction using the processing system 130, according to one aspect of the present disclosure. In one embodiment, the method 600 may be executed by the processing system 130.

At step 602, a parallel transaction system (e.g., the processing system 130 including the parallel payment system 135, transaction system 140, and the tokenization system 150 thereof) may receive an electronic transaction request of a payment vehicle (e.g., the payment vehicle 106). In one embodiment, the payment vehicle may comprise at least one of open-loop funds or closed-loop funds. At step 604, the parallel transaction system may determine a type of the payment vehicle, the type of the payment vehicle being at least one of an open-loop type, a closed-loop type, or a parallel type. In one embodiment, when the type of the payment vehicle is a parallel type, the parallel transaction system may determine an available amount of open-loop funds and an available amount of closed-loop funds associated with the payment vehicle.

At step 606, the parallel transaction system may execute an open-loop transaction, a closed-loop transaction, and/or a parallel transaction, based on the determined type of the payment vehicle. In one embodiment, the parallel transaction system may execute an open-loop transaction or a closed-loop transaction based on a user preference. In some embodiments, the user preference may comprise a priority for using open-loop funds or closed-loop funds. Additionally, the parallel transaction system may display a graphical user interface to request a user preference for using open-loop funds or closed-loop funds. Further, the parallel transaction system may receive by the user preference selected by the user 105 for using open loop-funds or closed-loop funds. Furthermore, the parallel transaction system may modify the electronic transaction based on the user preference. At step 608, the parallel transaction system may complete the electronic transaction request.

Figure 7:
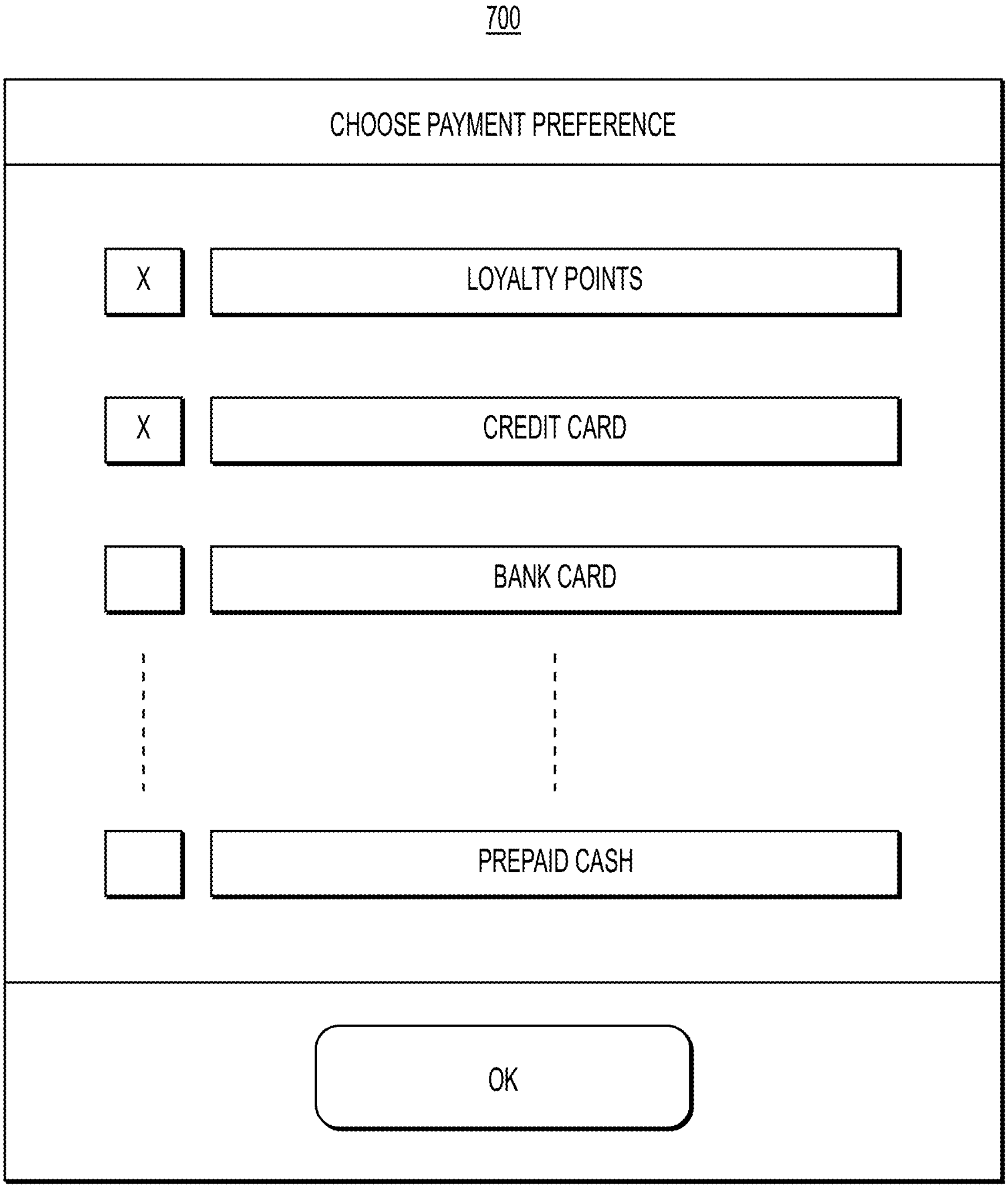
FIG. 7 depicts a flowchart of yet another exemplary method of executing a parallel transaction, according to one aspect of the present disclosure.

FIG. 7 shows an exemplary graphical user interface 700 that may be displayed on the POS terminal 110 and/or the browser 115. The graphical user interface 700 may be utilized for the methods 300-600. For example, the graphical user interface 700 may display options to choose between various open-loop and closed-loop payment vehicle types (e.g., a loyalty points card, a credit card, a bank card, a prepaid cash card, etc.) to be used for processing the purchase transactions of the methods 300-600. In one example, the user 105 may be given options to choose one or more types of payment vehicle accounts (e.g., open-loop payment account or closed-loop payment account) of a payment vehicle (e.g., parallel payment vehicle 201). In some embodiments, the graphical user interface 700 may display one or more options to prioritize which type of payment vehicle may be used first. For example, if the user 105 chooses to use a closed-loop payment account first, the processing system 130 may apply, if available, the funds from the closed-loop payment account for complete the purchase transaction.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 8:
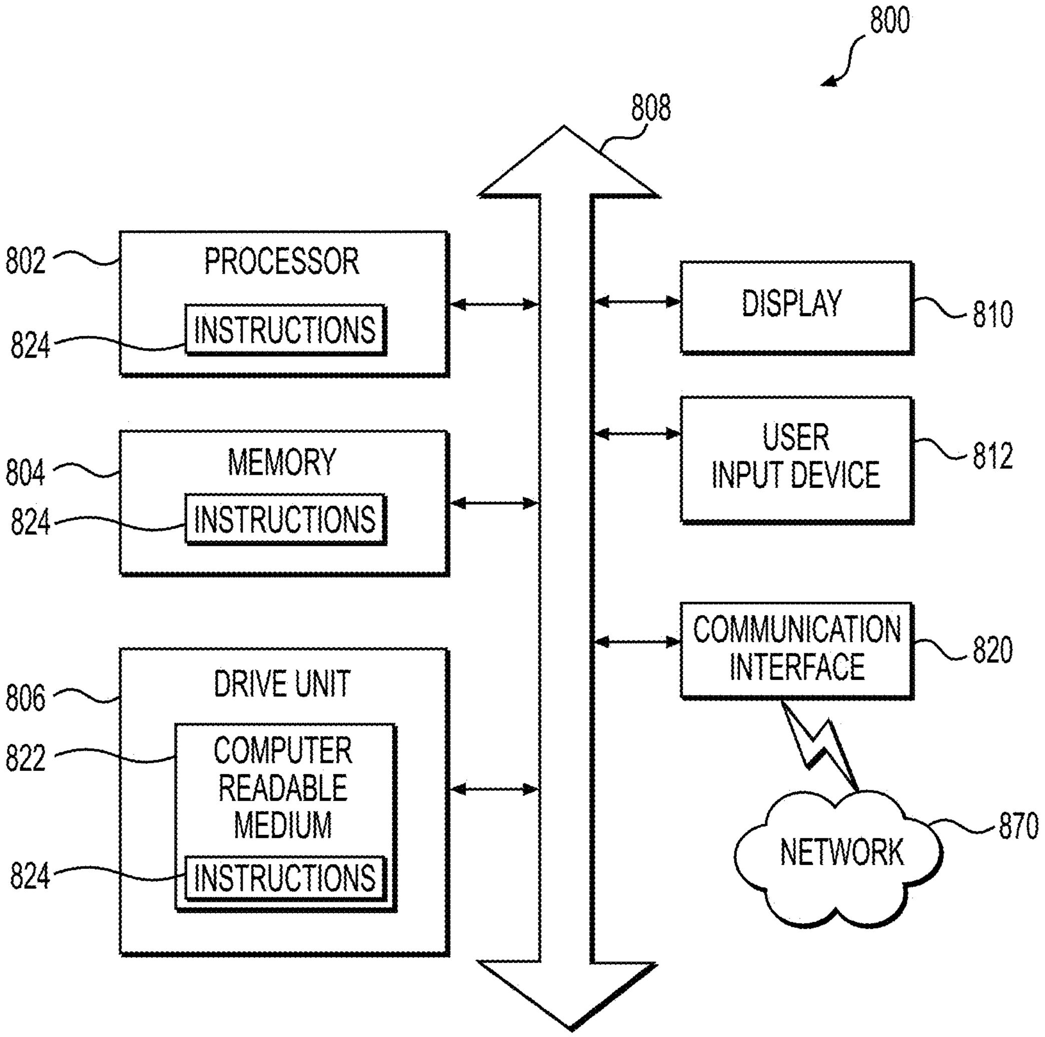
FIG. 8 illustrates a computer system for executing the techniques described herein.

FIG. 8 illustrates a computer system designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 804 includes a cache or random-access memory for the processor 802. In alternative implementations, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel payment and the like.

As shown, the computer system 800 may further include a display unit 810, such as a liquid crystal display (LCD), an organic light emitting diode (OLED), a flat panel display, a solid-state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 806.

Additionally or alternatively, the computer system 800 may include an input device 812 configured to allow a user to interact with any of the components of system 800. The input device 812 may be a number pad, a keyboard, or a cursor control device, such as a mouse, or a joystick, touch screen display, remote control, or any other device operative to interact with the computer system 800.

The computer system 800 may also or alternatively include a disk or optical drive unit 806. The disk drive unit 806 may include a computer-readable medium 822 in which one or more sets of instructions 824, e.g., software, can be embedded. Further, the instructions 824 may embody one or more of the methods or logic as described herein. The instructions 824 may reside completely or partially within the memory 804 and/or within the processor 802 during execution by the computer system 800. The memory 804 and the processor 802 also may include computer-readable media as discussed above.

In some systems, a computer-readable medium 822 includes instructions 824 or receives and executes instructions 824 responsive to a propagated signal so that a device connected to a network 870 can communicate voice, video, audio, images, or any other data over the network 870. Further, the instructions 824 may be transmitted or received over the network 870 via a communication port or interface 820, and/or using a bus 808. The communication port or interface 820 may be a part of the processor 802 or may be a separate component. The communication port 820 may be created in software or may be a physical connection in hardware. The communication port 820 may be configured to connect with a network 870, external media, the display 810, or any other components in system 800, or combinations thereof. The connection with the network 870 may be a physical connection, such as a wired Ethernet connection or may be established wirelessly as discussed below. Likewise, the additional connections with other components of the system 800 may be physical connections or may be established wirelessly. The network 870 may alternatively be directly connected to the bus 808.

While the computer-readable medium 822 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 822 may be non-transitory, and may be tangible.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 may be connected to one or more networks 870. The network 870 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 870 may include wide area networks (WAN), such as the Internet, local area networks (LAN), campus area networks, metropolitan area networks, a direct connection such as through a Universal Serial Bus (USB) port, or any other networks that may allow for data communication. The network 870 may be configured to couple one computing device to another computing device to enable communication of data between the devices. The network 870 may generally be enabled to employ any form of machine-readable media for communicating information from one device to another. The network 870 may include communication methods by which information may travel between computing devices. The network 870 may be divided into sub-networks. The sub-networks may allow access to all of the other components connected thereto or the sub-networks may restrict access between the components. The network 870 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for executing a parallel payment vehicle transaction by a payment processing system, the method comprising:

initiating, at a point-of-sale (POS) terminal, a transaction using a payment vehicle comprising in an embedded microchip, the embedded microchip comprising data;

transmitting, from the POS terminal, a payment transaction request to the payment processing system, the payment transaction comprising the data;

authenticating, by the payment processing system, the payment transaction request;

in response to the authenticating, determining, by the payment processing system, that the payment vehicle is a parallel payment vehicle;

determining, by the payment processing system, that the parallel payment vehicle is compatible with a merchant system associated with the POS terminal;

receiving, by the payment processing system and via an application programming interface (API), a payment request from the merchant system;

determining, by the payment processing system, a plurality of merchant program options associated with the merchant system, a plurality of user payment preferences, and an available balance of the parallel payment vehicle;

determining, by the payment processing system, that the user payment preferences include automatic redemption associated with the parallel payment vehicle;

determining, by the payment processing system, that the available balance of the parallel payment vehicle is greater than or equal to an amount associated with the transaction;

approving the transaction by the payment processing system;

reducing, by the payment processing system, the available balance of the parallel payment vehicle by the amount associated with the transaction; and sending, by the payment processing system, a notification for display on a user device, the notification indicating that the transaction is complete.

2. The computer-implemented method of claim 1, further comprising:

encrypting the data into a token using a tokenization system associated with the payment processing system.

3. The computer-implemented method of claim 2, further comprising:

determining, upon analysis of the token by the payment processing system, a type of the payment vehicle, the type of the payment vehicle being at least one of: a first type, a second type, or a combination type, wherein the combination type leverages first type data objects and second type data objects.

4. The computer-implemented method of claim 1, further comprising:

displaying, on a display screen of the POS terminal, a graphical user interface presenting the plurality of merchant program options including: A) one or more first type options and one or more second type options and B) one or more priority options that define a payment processing priority order for the one or more first type options and/or the one or more second type options during a processing of the transaction.

5. The computer-implemented method of claim 1, further comprising:

receiving, at a graphical user interface of the POS terminal, the plurality of user payment preferences via selections from a user at the graphical user interface, the plurality of user payment preferences identifying a predetermined order of use of one or more types of the payment vehicle.

6. The computer-implemented method of claim 1, further comprising:

determining, by the payment processing system, that the user payment preferences does not include automatic redemption associated with the parallel payment vehicle; and processing, by the payment processing system, the transaction according to an open-loop payment process.

7. The computer-implemented method of claim 1, further comprising:

determining, by the payment processing system, that the available balance of the parallel payment vehicle is less than or equal to an amount associated with the transaction; and reducing, by the payment processing system, the available balance of the parallel payment vehicle to a value of zero.

8. A payment processing system comprising:

one or more computer readable media storing instructions for executing a parallel payment vehicle transaction; and one or more processors configured to execute the instructions to perform operations comprising:

initiating, at a point-of-sale (POS) terminal, a transaction using a payment vehicle comprising an embedded microchip, the embedded microchip comprising data;

transmitting, from the POS terminal, a payment transaction request to the payment processing system, the payment transaction comprising the data;

authenticating, by the payment processing system, the payment transaction request;

in response to the authenticating, determining, by the payment processing system, that the payment vehicle is a parallel payment vehicle;

determining, by the payment processing system, that the parallel payment vehicle is compatible with a merchant system associated with the POS terminal;

receiving, by the payment processing system and via an application programming interface (API), a payment request from the merchant system;

determining, by the payment processing system, a plurality of merchant program options associated with the merchant system, a plurality of user payment preferences, and an available balance of the parallel payment vehicle;

determining, by the payment processing system, that the user payment preferences include automatic redemption associated with the parallel payment vehicle;

determining, by the payment processing system, that the available balance of the parallel payment vehicle is greater than or equal to an amount associated with the transaction;

approving the transaction by the payment processing system;

reducing, by the payment processing system, the available balance of the parallel payment vehicle by the amount associated with the transaction; and sending, by the payment processing system, a notification for display on a user device, the notification indicating that the transaction is complete.

9. The payment processing system of claim 8, the operations further comprising:

encrypting the data into a token using a tokenization system associated with the payment processing system.

10. The payment processing system of claim 9, the operations further comprising:

determining, upon analysis of the token by the payment processing system, a type of the payment vehicle, the type of the payment vehicle being at least one of: a first type, a second type, or a combination type, wherein the combination type leverages first type data objects and second type data objects.

11. The payment processing system of claim 8, the operations further comprising:

displaying, on a display screen of the POS terminal, a graphical user interface presenting the plurality of merchant program options including: A) one or more first type options and one or more second type options and B) one or more priority options that define a payment processing priority order for the one or more first type options and/or the one or more second type options during a processing of the transaction.

12. The payment processing system of claim 8, the operations further comprising:

receiving, at a graphical user interface of the POS terminal, the plurality of user payment preferences via selections from a user at the graphical user interface, the plurality of user payment preferences identifying a predetermined order of use of one or more types of the payment vehicle.

13. The payment processing system of claim 8, the operations further comprising:

determining, by the payment processing system, that the user payment preferences does not include automatic redemption associated with the parallel payment vehicle; and processing, by the payment processing system, the transaction according to an open-loop payment process.

14. The payment processing system of claim 8, the operations further comprising:

determining, by the payment processing system, that the available balance of the parallel payment vehicle is less than or equal to an amount associated with the transaction; and reducing, by the payment processing system, the available balance of the parallel payment vehicle to a value of zero.

15. A non-transitory computer-readable medium storing instructions for executing a parallel payment vehicle transaction, the instructions, when executed by one or more processors, causing the one or more processors to perform operations comprising:

initiating, at a point-of-sale (POS) terminal, a transaction using a payment vehicle comprising an embedded microchip, the embedded microchip comprising data;

transmitting, from the POS terminal, a payment transaction request to the payment processing system, the payment transaction comprising the data;

authenticating, by the payment processing system, the payment transaction request;

in response to the authenticating, determining, by the payment processing system, that the payment vehicle is a parallel payment vehicle;

determining, by the payment processing system, that the parallel payment vehicle is compatible with a merchant system associated with the POS terminal;

receiving, by the payment processing system and via an application programming interface (API), a payment request from the merchant system;

determining, by the payment processing system, a plurality of merchant program options associated with the merchant system, a plurality of user payment preferences, and an available balance of the parallel payment vehicle;

determining, by the payment processing system, that the user payment preferences include automatic redemption associated with the parallel payment vehicle;

determining, by the payment processing system, that the available balance of the parallel payment vehicle is greater than or equal to an amount associated with the transaction;

approving the transaction by the payment processing system;

reducing, by the payment processing system, the available balance of the parallel payment vehicle by the amount associated with the transaction; and sending, by the payment processing system, a notification for display on a user device, the notification indicating that the transaction is complete.

16. The non-transitory computer-readable medium of claim 15, the operations further comprising:

encrypting the data into a token using a tokenization system associated with the payment processing system.

17. The non-transitory computer-readable medium of claim 16, the operations further comprising:

determining, upon analysis of the token by the payment processing system, a type of the payment vehicle, the type of the payment vehicle being at least one of: a first type, a second type, or a combination type, wherein the combination type leverages first type data objects and second type data objects.

18. The non-transitory computer-readable medium of claim 15, the operations further comprising:

displaying, on a display screen of the POS terminal, a graphical user interface presenting the plurality of merchant program options including: A) one or more first type options and one or more second type options and B) one or more priority options that define a payment processing priority order for the one or more first type options and/or the one or more second type options during a processing of the transaction.

19. The non-transitory computer-readable medium of claim 15, the operations further comprising:

receiving, at a graphical user interface of the POS terminal, the plurality of user payment preferences via selections from a user at the graphical user interface, the plurality of user payment preferences identifying a predetermined order of use of one or more types of the payment vehicle.

20. The non-transitory computer-readable medium of claim 15, the operations further comprising:

determining, by the payment processing system, that the user payment preferences does not include automatic redemption associated with the parallel payment vehicle; and processing, by the payment processing system, the transaction according to an open-loop payment process.

* * * * *